(12) United States Patent
Eteläperä

(10) Patent No.: US 7,812,786 B2
(45) Date of Patent: Oct. 12, 2010

(54) USER INTERFACE FOR DIFFERENT DISPLAYS

(75) Inventor: Esa Eteläperä, Tampere (FI)

(73) Assignee: Nokia Corporation, Espoo (FI)

( * ) Notice: Subject to any disclaimer, the term of this patent is extended or adjusted under 35 U.S.C. 154(b) by 888 days.

(21) Appl. No.: 11/039,058

(22) Filed: Jan. 18, 2005

(65) Prior Publication Data

US 2006/0158385 A1 Jul. 20, 2006

(51) Int. Cl.
*G09G 5/00* (2006.01)
*H04M 1/00* (2006.01)
*G06F 1/24* (2006.01)
*G06F 3/048* (2006.01)

(52) U.S. Cl. .................. 345/3.3; 455/566; 713/100; 715/788

(58) Field of Classification Search ............... 345/1.1, 345/1.2, 1.3, 3.1, 659, 649; 455/566; 715/798, 715/802, 825, 861, 858, 788; 713/100
See application file for complete search history.

(56) References Cited

U.S. PATENT DOCUMENTS

| | | | | |
|---|---|---|---|---|
| 5,038,301 | A | 8/1991 | Thoma, III | 364/521 |
| 5,682,529 | A * | 10/1997 | Hendry et al. | 713/100 |
| 6,118,413 | A | 9/2000 | Bril et al. | 345/3 |
| 6,144,358 | A * | 11/2000 | Narayanaswamy et al. | 345/5 |
| 6,252,602 | B1 | 6/2001 | Matsuda et al. | 345/425 |
| 6,390,371 | B1 | 5/2002 | Armga et al. | 235/472.01 |
| 7,016,704 | B2 * | 3/2006 | Pallakoff | 455/566 |
| 2002/0094826 | A1 | 7/2002 | Lee | |
| 2002/0151283 | A1 | 10/2002 | Pallakoff | 455/90 |
| 2003/0100963 | A1 | 5/2003 | Potts et al. | 700/83 |
| 2003/0163666 | A1 | 8/2003 | Cupps et al. | 712/1 |
| 2004/0163046 | A1 | 8/2004 | Chu et al. | |
| 2005/0262302 | A1 | 11/2005 | Fuller et al. | 711/119 |
| 2006/0109198 | A1 * | 5/2006 | Chow et al. | 345/1.1 |

FOREIGN PATENT DOCUMENTS

| | | |
|---|---|---|
| EP | 0 776 140 | 5/1997 |
| EP | 0836157 A2 | 4/1998 |
| EP | 1217422 | 6/2002 |
| EP | 1 603 037 | 12/2005 |
| GB | 2 384 132 | 7/2003 |
| JP | 10-161621 | 6/1998 |
| JP | 2000172395 | 6/2000 |
| JP | 2002-023718 | 1/2002 |
| WO | WO 2006/043977 | 4/2006 |

OTHER PUBLICATIONS

*EPODOC/EPO, Mar. 21, 2006, Machine translation.
European Patent Office Search Report issued on Jun. 24, 2009 in corresponding EP patent application No. 06701199.9 (12 pages).
Russian Office Action dated Nov. 26, 2009, 3 pages English translation.
Patent Abstracts of Japan for JP 2002-023718, dated Jan. 25, 2002.
Patent Abstracts of Japan for JP 10-161621, dated Jun. 19, 1998.
Japanese Patent Office; "Office Action"; entire document; Mar. 23, 2010; with English translation.

* cited by examiner

*Primary Examiner*—Kevin M Nguyen

(57) ABSTRACT

This invention relates to a method for adjusting a graphical user interface for at least two displays, wherein due to an activation of at least one of at least two displays the graphical user interface is informed about the characteristics of said at least one activated display whereby the graphical user interface is refreshed according to said characteristics. This invention also relates to a display system, to a device, to a graphical user interface and to a computer program product.

42 Claims, 6 Drawing Sheets

Fig. 3a
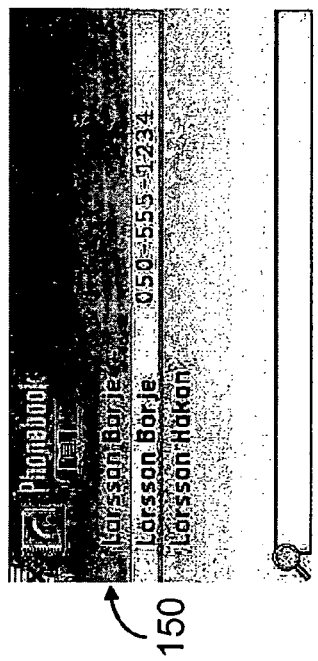
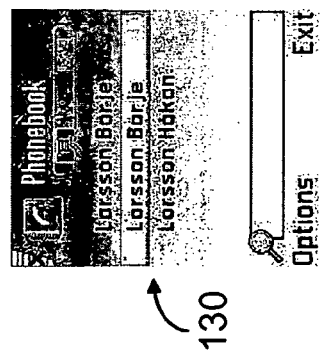
Fig. 3b
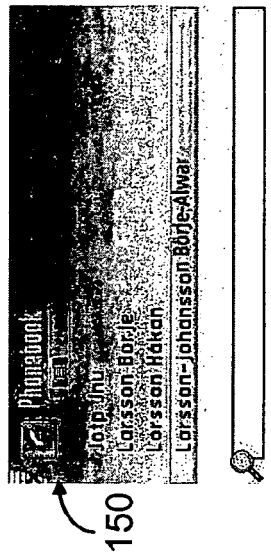
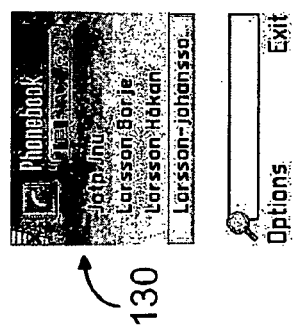
Fig. 3c
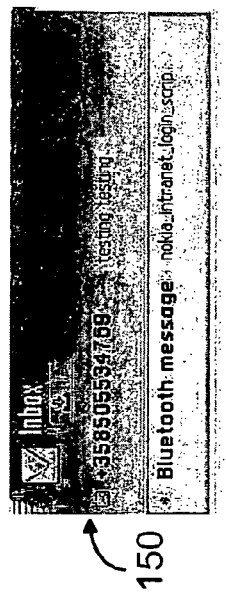

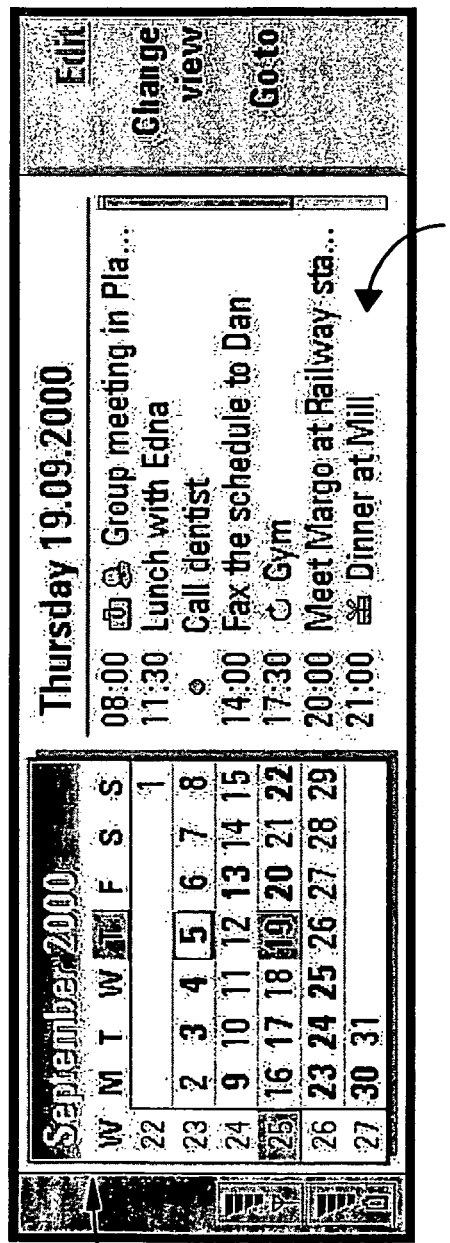
Fig. 6a
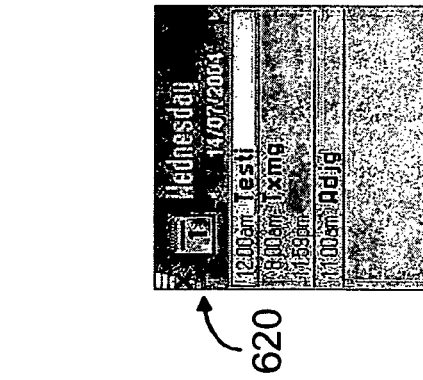
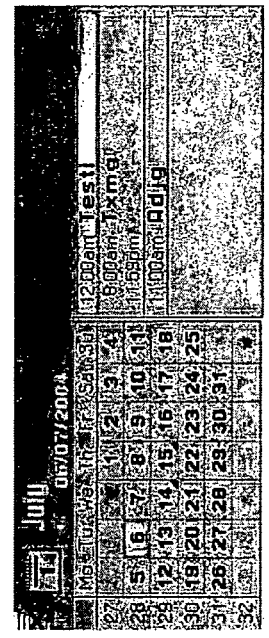
Fig. 6c
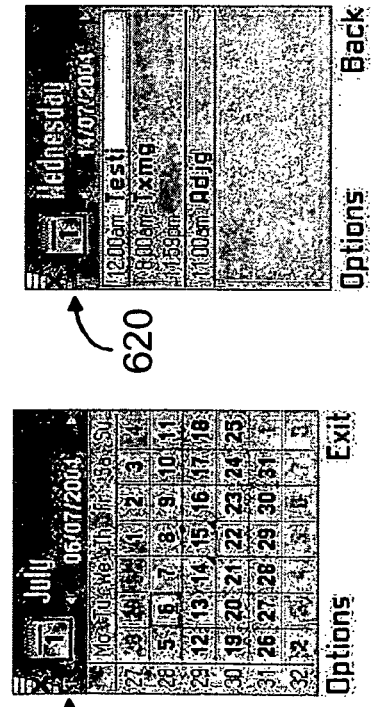
Fig. 6b

USER INTERFACE FOR DIFFERENT DISPLAYS

FIELD OF THE INVENTION

This invention relates to devices having displaying capabilities and more particularly to such devices that comprise at least two displays, wherein user interface is presented.

BACKGROUND OF THE INVENTION

Nowadays there are displays in different devices capable of presenting application related information via an application user interface (UI) that is used by the device in question. A single display type has its own application UI software that enables presenting the information as effectively as possible. Because of different sizes of different displays one user interface is not necessarily suitable for another display, especially if the size difference is great, e.g. when the user interface is designed for a PC display and that same user interface is wanted to be viewed in a PDA display.

The problems of adapting display data (presentation) between different sizes of displays is taken into account, for example, in publication US 2004/0163046 A1. Said publication relates to a scalable architecture to adapt applications to the user interface of different heterogeneous device platforms. According to the solution presented in the publication, application developers may build an application graphical user interface (GUI) that is independent of the user interface capabilities within each device platform. The architecture allowing this includes a scalable GUI library, a customizing module having a task manager module and a transformation manager module, and a render manager module. When a scalable application is launched or migrated to one of the heterogeneous device platforms an intermediate representation of the application GUI is instantiated by the scalable application. This intermediate representation may be dynamically customized by the customizing module based on the capabilities of the target device platform as well as properties specified by application developers of the application GUI.

The previous solution is addressed to application developers building applications that can be run by different devices. The solution of the publication is targeted to a situation where the application is at first built and then transferred in the device in question and scaled there. After installing, the application stays in that device and no operations are needed again.

SUMMARY OF THE INVENTION

The current invention relates to a method, a display system, a device, a graphical user interface and a computer program product for adjusting user interface for different displays.

The method for adjusting a graphical user interface for at least two displays, wherein in response to an activation of at least one of said at least two displays the graphical user interface is refreshed for said activated display according to characteristics of said activated display.

The display system comprises at least two displays and a graphical user interface for said displays, said system comprising means for activating said displays, whereby in response to an activation of at least one of said at least two displays the graphical user interface is capable of refreshing itself for said activated display according to characteristics of said activated display.

The device with at least two displays, comprises a graphical user interface for said at least two displays, said device comprising means for activating said displays, whereby in response to an activation of at least one of said at least two displays the graphical user interface is capable of refreshing itself for said activated display according to characteristics of said activated display.

The graphical user interface for a display, comprises controlling means for receiving information about characteristics of a display in response to an activation of said display, whereby the controlling means are capable of adjusting said graphical user interface according to said characteristics to said activated display.

The computer program product for a displaying device having at least two displays and a graphical user interface, comprises computer readable instructions configured to receive information on an activation of at least one of said at least two displays, and in response to the activation of said display to refresh the user interface for said activated display according to characteristics of said activated display.

The other embodiments are described on the attached dependent claims.

Thanks to the current solution the amount of display specific user interface software on dual display devices can be minimized. Due to the current invention there is no need to have display specific user interface framework or application software, but the one user interface is adjustable between several displays with different characteristics. This is advantageous especially when the displays are within one device, but the invention can be applied also with two different displaying devices.

DESCRIPTION OF THE DRAWINGS

The accompanying drawings, which are incorporated in and constitute a part of this specification, illustrate examples relating to this invention and, together with the description, explain the objects, advantages and principles of the invention. In the drawings FIGS. 1a,b illustrate an example of a device utilizing the present invention, FIGS. 3a-c illustrate examples of user interface views, FIGS. 4a,b illustrate examples of desk application user interface views, FIGS. 6a-c illustrate examples of calendar application UI views.

DETAILED DESCRIPTION OF THE INVENTION

Figure 1:
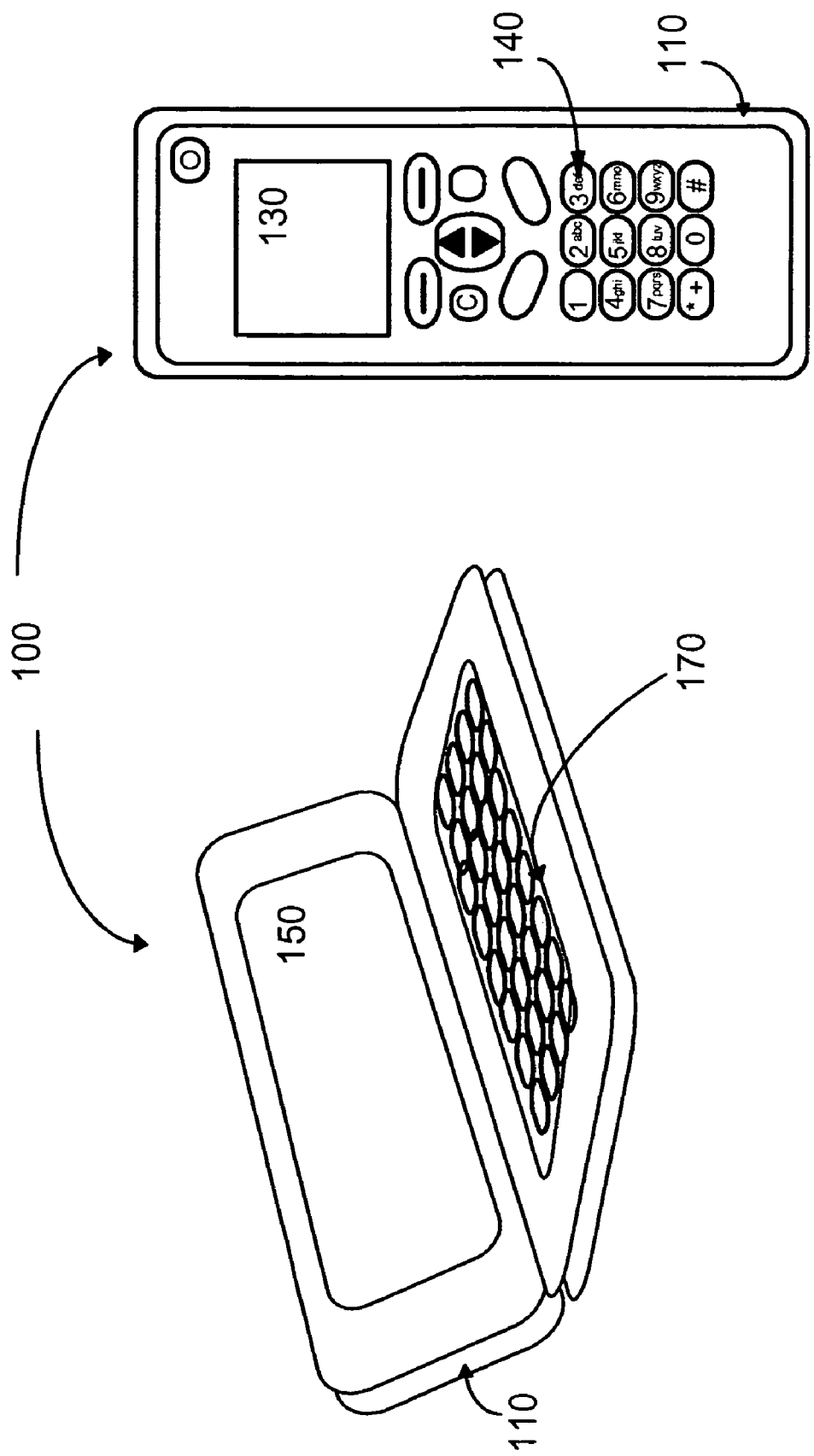

Although specific terms are used in the following description for the sake of clarity, these terms are intended to refer only to the particular structure of the invention selected for illustration in the drawings and are not necessarily intended to define the scope of the invention.

In this detailed description a term "PDA (Personal Digital Assistant) display" is used for describing a "wide" screen and "phone display" is used for describing "narrow" screen. It is obvious that terms "wide" and "narrow" may have different sizes in different situation, but the main thing is that these displays are compared to each other, and therefore the other display is "wider" than the other. In some situations also some other characteristics may raise the need for user interface adjusting. For example different shapes of displays (e.g. circular display), different interaction capabilities of displays (e.g. the other one is touch screen), different presentation capabilities of displays (black-and-white compared to color displays), etc. In this description Symbian S60 platform is used as an example of the user interface to be used in the phone display and therefore in this description the extended S60 platform is an example of a platform that can be suited both to phone type of display but also to PDA type of display. However it will be appreciated that the main idea of the invention is not dependent on the platform types.

In this solution there is no need for display specific user interface software in devices having at least two displays. The information share and the dynamic change of user interface layout can be implemented according to this invention. In this solution display sizes, resolutions and form factors of the displays are assumed to be within the limits of the same UI style as well as the used UI framework may implement run time UI scalability. Run time UI scalability means in this description the capability of the UI framework and applications to obey changes in display characteristics instantly, without re-compiling or re-starting applications.

Figure 2:
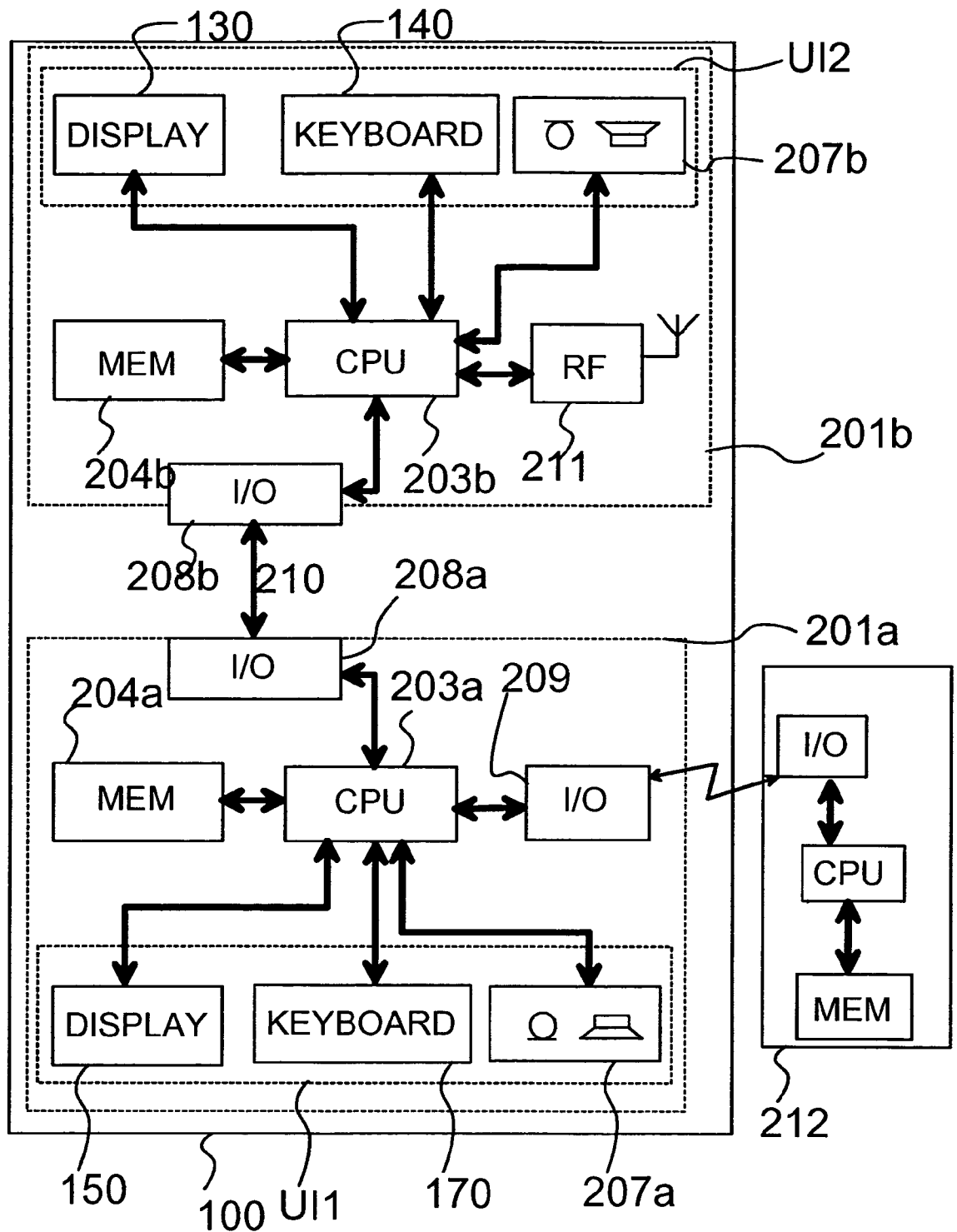
FIG. 2 illustrates a block chart example of a structure of the device.

The solution is discussed in a more detailed manner by means of an example and FIGS. 1 and 2. In the FIGS. 1, 2 an example of a device 100 is presented. Before describing the invention in a more detailed manner, the device 100 is taken into account by means of FIG. 2.

The device 100 is composed of two processing units 201a, 201b of which the first processing unit 201a is a personal digital assistant (PDA) and the other processing unit 201b is a wireless communication device. Processing units 201a, 201b comprise hardware user interfaces UI1, UI2. The device 100 comprises also processors 203a, 203b that control the functions of the processing units 201a, 201b respectively. However, the processing units 201a, 201b may not necessarily need to have their own processors, it is also possible to have a shared one and in some situations the device may comprise several processors. The processors 203a, 203b can be micro processors, micro controllers or similar, and they can comprise an ASIC circuit. The device 100 comprises also memory means 204a, 204b, bus connecting means 208a, 208b, external connecting means 209 to e.g. memory card interface 212 or IR data transfer means. The other processing unit 201b comprises communicating means 211 for connecting to communication network.

The communication within the device 200, between the processing units 201a, 201b is implemented via internal bus 210. The hardware user interfaces UI1, UI2 comprise at least displays 130, 150 and inputting means, such as keypad 140, 170. The hardware user interface UI1, UI2 may also comprise audio means 207a, 207b, such as loudspeaker and microphone.

The displays 130, 150 have a graphical user interface (GUI) software to be run on said displays. The GUI software is designed to be shown in both displays. Therefore for two displays there are one UI software, but because of the different sizes of the displays 130, 150 GUI needs to be adjusted to each display. In the example of the FIGS. 1a, b one display is activated when the other is deactivated. The activation/deactivation is carried out by closing and opening a cover 110 whereby the when the cover is opened the PDA display 150 is activated and when the cover is closed the phone display 130 is activated. At the same time the other of the displays may be deactivated if not needed. However, in some situations both of the displays can be in activated state, whereby the user interface can be presented on both of the displays. In FIG. 1a the device is in "opened" position, wherein the cover 110 is opened and the PDA display 150 is active. FIG. 1b illustrates a situation where the cover 110 is closed, the PDA display 150 is deactivated and the phone display 130 is activated. In this example the activation is due to the function of cover 110, however the activation of a display can be carried out by launching a display, taking a screensaver off, or by some other operations that cause the activity of the display. For example the activation of display in a device that comprises two displays on opposite sides of said device may occur by detecting which of the two sides is turned to the user.

Due to the activation of one of the displays 130, 150 the GUI software is notified about changes of display characteristics, such as e.g. display resolution, display size and form factor. GUI software comprising GUI framework and applications obey this notification and refresh their GUI content, e.g. by means of controlling means. In addition, based on the display activation/de-activation the lowest level graphics context is directed to the display memory of the activated display. The notification of the change is transferred within the device by the target display being activated. In other words, the target display may provide its characteristics to the GUI software.

This kind of GUI can be adjusted between the phone display and the PDA display. The GUI applications are processed in different ways depending on which size of display the application is presented. In the following the extended S60 platform is disclosed as an example of a method for handling different applications.

The extended S60 UI software should be able to take into account the current applications of a telephone unit and how they are adapted to the PDA side, and how typical PDA (specific) applications are handled by S60 UI software that said applications are presented correctly in the PDA display.

Applications, such as word processor, spreadsheet, Presentation, Browser and Message editors, are typical examples of PDA specific applications. In these applications the application active area is typically filled with application specific content. As this kind of application needs to be able to cope with variable screen sizes in S60 UI software, stretching the screen size to a PDA display is straightforward.

Applications that have a single column list view, e.g. a telephone application, have data (e.g. text, numbers, icons) arranged into one or more tabulated columns. According to the size and capabilities of the display, the number or amount of the columns to be shown is decided. For example (FIG. 3a) in phone display (130) one column is shown and in PDA display (150) two columns are shown. The number or amount of the columns shown is increased according to the width of the display, or the number or amount of the columns shown can be selected by the user. Another example (FIG. 3b) is to show one column in both display sizes, but showing more content in the PDA display (150). For instance, when the phone display (130) shows as much surname and first name as possible in the telephone application, the PDA display (150) can show names completely. Yet another example (message inbox in FIG. 3c) is to arrange the tabulated columns horizontally (side by side) on the PDA display (150) and vertically on the phone display (130).

Figure 4A:
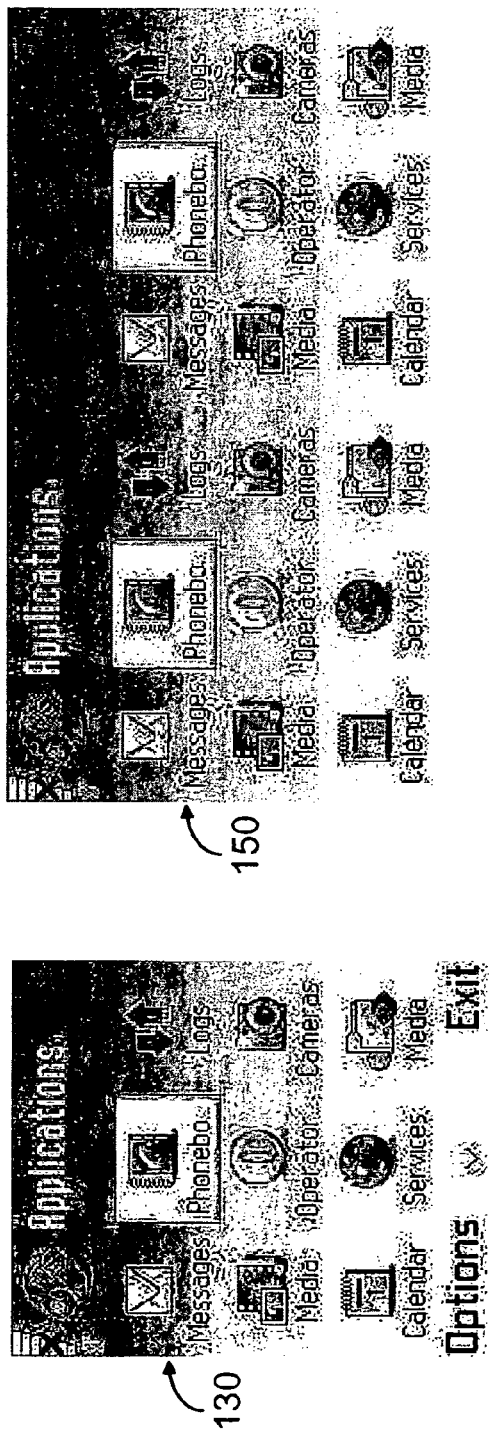
Figure 4B:
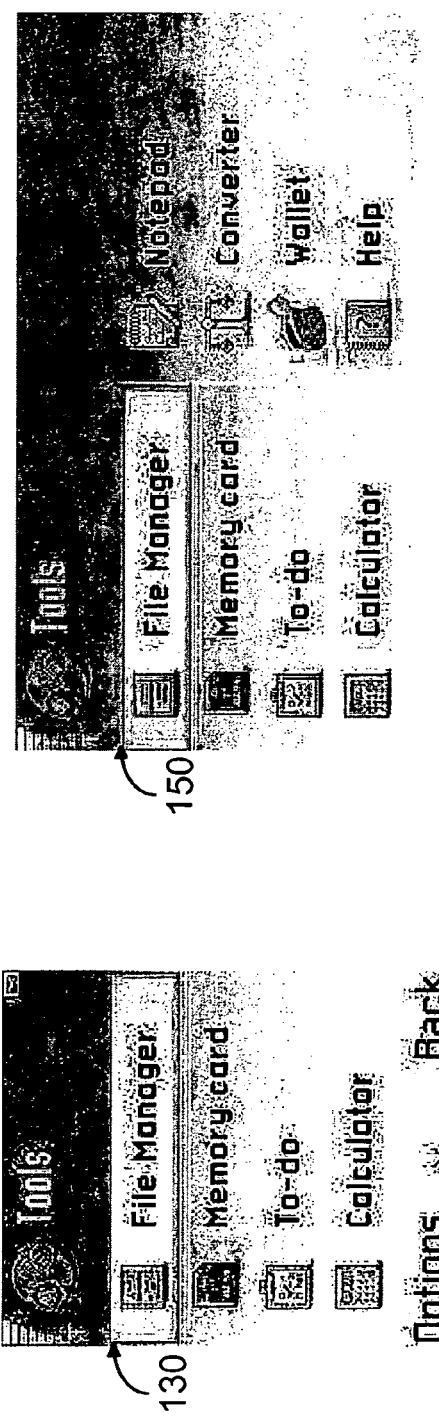

An example of an application having a grid view application is presented in FIG. 4a. A typical example grid view application is a desktop, wherein objects are placed one upon the other and side-by-side. The grid view layout can be stretched on the PDA display (150) by placing more objects horizontally. In the phone display (130) the amount of objects side by side is reduced to fit the width of the display by locating the rest vertically. Similarly, with a multicolumn list view (FIG. 4b) many more columns are presented on the display horizontally in the PDA display 150 than is possible by the current width of the phone display 130.

Figure 5A:
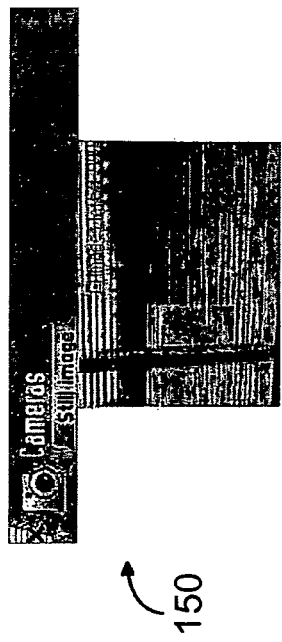
FIGS. 5a-c illustrate example of imaging application user interface views.
Figure 5B:
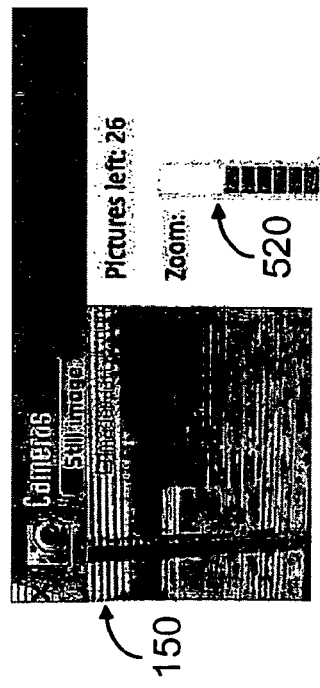
Figure 5C:
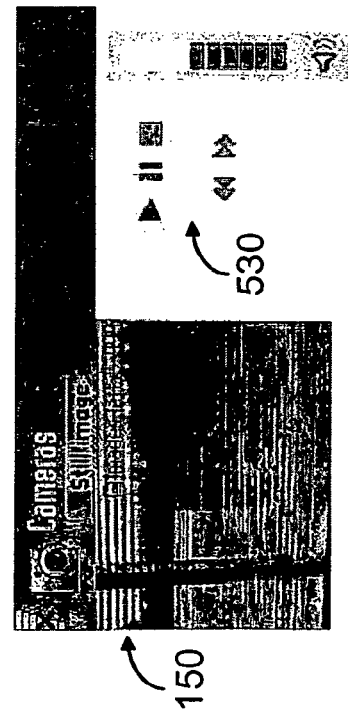

Voice recorder and Images are typical PDA applications that fill the "empty space" with non-functional content (if any). An S60 application UI can be used to implement these kinds of layouts in the following manner: the application can add application specific graphics (520) and/or status information to the empty space (as in FIG. 5b) or the empty space is not utilized at all as in FIG. 5a or if the device concept supports a pen or stylus input UI and there is space available on the viewing area, the UI framework can provide pen shortcuts (530 in FIG. 5c) to the empty space.

A dual pane application, such as calendar application, refers to such an application wherein the content of the other pane changes according to the selections or cursor movement on the other pane. For example in calendar application (FIG. 6a) the other pane presents a month view (610) and the other pane presents a day view (620). In the phone display (FIG. 6b) the dual pane view can be implemented by displaying in the first view the first pane (610) and a user selection in it provides an opening of the other pane (620). E.g., in a calendar application, at first the month is displayed whereby the selection of a day invokes the day view. The behavior of a dual pane with S60 in the PDA display can be achieved e.g. by presenting both the month view and the day view on the screen (150) at the same time (e.g. month on left hand side, day view on the right hand side). When the focus is on the month view pane, application code handling a month view functions as with current S60, except that it automatically notifies the day view pane when the cursor moves to another day (which then causes the day view content to be updated). When the focus is on the day view pane, application code handles the day as the in S60 UI.

Other dual pane applications (e.g. message center, contact manager, file manager) can be adjusted similarly. Basically when the focus is on the left hand side pane, the right hand side pane may just only follow the cursor movements and updates its content or vice-versa. When the focus is moved to right hand side pane, it functions as in a phone display. It does not necessarily need to be aware of the left hand side pane at all. If the user interface concept (resolution and screen form factor) supports dual pane mode, application views should normally be able to locate themselves to either of the panes and update their content on-request. Views should normally also be able to present (graphically) whether they are "in-focus" or "out-of-focus" (also GUI framework can handle this).

Dialog layout (List pane), that can be found from the S60 user interface, does not necessarily utilize a wider screen area as such but the following options could be used on a wider screen area: the current dialog layout is kept but the dialog box is allowed to float on top of the current application or the dialog box GUI can be modified to better utilize horizontal space (when it is available).

In most cases, the implementation of the adjusting method does not need changes in application implementation. The GUI framework and the applications support the adjusting within limits of the same GUI style, e.g. S60 and S80. Therefore the applications and GUI framework do not necessarily need to know the amounts of the displays, but they are arranged to adjust themselves due to the notification.

In the previous description the graphical user interface is adjusted to displays according to the characteristics of the display in question. However, anyone skilled in the art will appreciate that the adjusting is not desired every time. For example, text documents (e.g. fax) or web pages may be better presented on every display in such a size that they still can be seen well on the display in question. It should be also noticed that in this description the adjusting is targeted to the width of the user interface. However, this is not always the case. In some situations other adjusting directions can be used as well.

In the previous description the device comprises two displays. However it is possible to utilize the invention with more than two displays, e.g. when the device running the user interface software is connected to some other displaying device, e.g. personal computer and hence forming a display system. The need for activating the auxiliary display can be detected when the connection between the auxiliary display and the device is formed.

By understanding the nature of the previous examples, it will be appreciated that variations and modifications of them are possible without departing from the scope of protection of the invention as set forth in the claims.

The invention claimed is:

1. A method, comprising:
a graphical user interface displaying graphical interface content on a display within an electronic device having two displays;
activating an other display of said two displays;
said other display informing the graphical user interface about the characteristics of said other display,
in response to the activation of said other display, refreshing the graphical user interface content and dynamically changing the layout of the graphical user interface content for said other display on the basis of characteristics of said other display;
displaying the changed layout on said other display.

2. The method according to claim 1, wherein:
said other display informing said graphical user interface about the characteristics of said other display relates to at least one of the following display feature: size, shape, presentation capabilities, interaction capabilities.

3. The method according to claim 1, wherein said two displays are of different size.

4. The method according to claim 1, comprising:
deactivating said display in response to the activation of said other display.

5. The method according to claim 1, comprising:
presenting the graphical user interface content on both of the two displays.

6. The method according to claim 1, comprising:
informing said graphical user interface about display resolution, display size or form factor.

7. The method according to claim 1, comprising:
informing a user interface framework and an application belonging to said graphical user interface about display resolution, display size or form factor.

8. The method according to claim 1, comprising:
refreshing a user interface application belonging to said graphical user interface on the basis of a type of the user interface application.

9. The method according to claim 1, wherein the two displays comprise at least two displays of the electronic device.

10. The method according to claim 1, wherein the graphical user interface is for an application selected from the group of: word processor, spreadsheet, presentation, browser, message editor, and the layout of the graphical user interface content comprises application specific content.

11. The method according to claim 1, wherein the graphical user interface is for an application that is configured to display one or more tabulated columns, and wherein dynamically changing the layout of the graphical user interface content for said other display comprises displaying a number or amount of columns on the basis of characteristics of said other display.

12. The method according to claim 11, wherein the application is a telephone application.

13. The method according to claim 1, wherein dynamically changing the layout of the graphical user interface content comprises displaying tabulated columns horizontally or vertically on the basis of characteristics of said other display.

14. The method according to claim 1, wherein the graphical user interface is for an application that is configured to display a single column list view, and wherein the amount of content to be displayed in the column on the graphical user interface content is set on the basis of characteristics of said other display.

15. The method according to claim 14, wherein the application is a telephone application.

16. The method according to claim 1, wherein the graphical user interface is for an application comprising a grid view, and wherein dynamically changing the layout of the graphical user interface content for said other display comprises placing a number of objects horizontally on the basis of said characteristics of said other display.

17. The method according to claim 16, wherein the grid view is a desktop.

18. The method according to claim 1, wherein the graphical user interface is for a PDA application, and wherein dynamically changing the layout of the graphical user interface content for said other display comprises filling "empty space" with content.

19. The method according to claim 18, wherein said content comprises non-functional content comprising one or more of application specific graphics, and status information.

20. The method according to claim 18, wherein said content provides for pen shortcuts.

21. The method according to claim 18, wherein the PDA application comprises an application selected form the group of: a voice recorder application; and an image application.

22. The method according to claim 1, wherein the graphical user interface is for a dual pane application, and wherein:
displaying said graphical user interface content on said display comprises displaying a single pane; and
dynamically changing the layout of the graphical user interface content for said other display comprises changing the layout of the graphical user interface content such that is configured to display two panes.

23. The method according to claim 22, wherein the dual pane application is an application selected from the group of: a calendar application, a message center, a contact manager, and a file manager.

24. Apparatus for an electronic device, the device comprising two displays; wherein said apparatus is configured to:
display graphical user interface content on one of the two displays;
receive information relating to an activation of an other of said two displays;
receive information relating to characteristics of said other display from said other display;
wherein, in response to said activation of said other display, the apparatus is configured to refresh the graphical user interface content for said other display and dynamically change the layout of the graphical user interface content on the basis of the characteristics of said other display; and
display said changed layout on said other display.

25. The apparatus according to claim 24, wherein said characteristics relate to at least one of the following display features: size, shape, presentation capabilities, interaction capabilities.

26. The apparatus according to claim 24, wherein the apparatus is configured to present said graphical user interface content on both of the displays.

27. The apparatus according to claim 24, wherein the apparatus is a processor.

28. An electronic device comprising:
two displays; and
the apparatus according to claim 24.

29. The device according to claim 28, wherein said one display has a viewing area of a size different from said other display.

30. The device according to claim 28, further comprising means for communication.

31. The device according to claim 28, further comprising PDA functionality.

32. The electronic device according to claim 28, wherein the two displays comprise at least two displays of the electronic device.

33. The apparatus according to claim 24, wherein the two displays comprise at least two displays of the electronic device.

34. A memory for a single electronic device having two displays and a graphical user interface useable for each of said two displays to display graphical user interface content, said memory comprising computer readable instructions for execution by a processor of said single electronic device configured to cause said single electronic device to:
receive information on an activation of one of the displays,
receive information relating to characteristics of said activated display from said activated display, and,
in response to the activation of said activated display, to refresh the graphical user interface content and dynamically change a layout of the graphical user interface content for said activated display according to characteristics of said activated display.

35. The memory according to claim 34, wherein said one display has a viewing area of a size different from one other of said two displays.

36. The memory according to claim 34, further comprising computer readable instructions configured to present said graphical user interface content on both of the displays.

37. The memory according to claim 34, wherein the two displays comprise at least two displays of the electronic device.

38. A memory for a single electronic device having two displays and a graphical user interface useable for each of said two displays displaying graphical interface content, said memory comprising computer readable instructions for execution by a processor of said single electronic device configured, in response to an activation of one of the displays, to cause said single electronic device to:
cause said activated display to inform the graphical user interface about characteristics of said activated display, and
refresh the graphical user interface content and dynamically change the layout of the graphical user interface content for said activated display based on characteristics of said activated display.

39. The memory according to claim 38, further comprising computer readable instructions configured to receive information on said activation of said activated display.

40. The memory according to claim 38, further comprising computer readable instructions configured to receive information about the characteristics of said activated display.

41. The memory according to claim 38, wherein said characteristics relate to at least one of the following display features: size, shape, presentation capabilities, interaction capabilities.

42. The memory according to claim 38, wherein the two displays comprise at least two displays of the electronic device.

* * * * *